Figure 1:
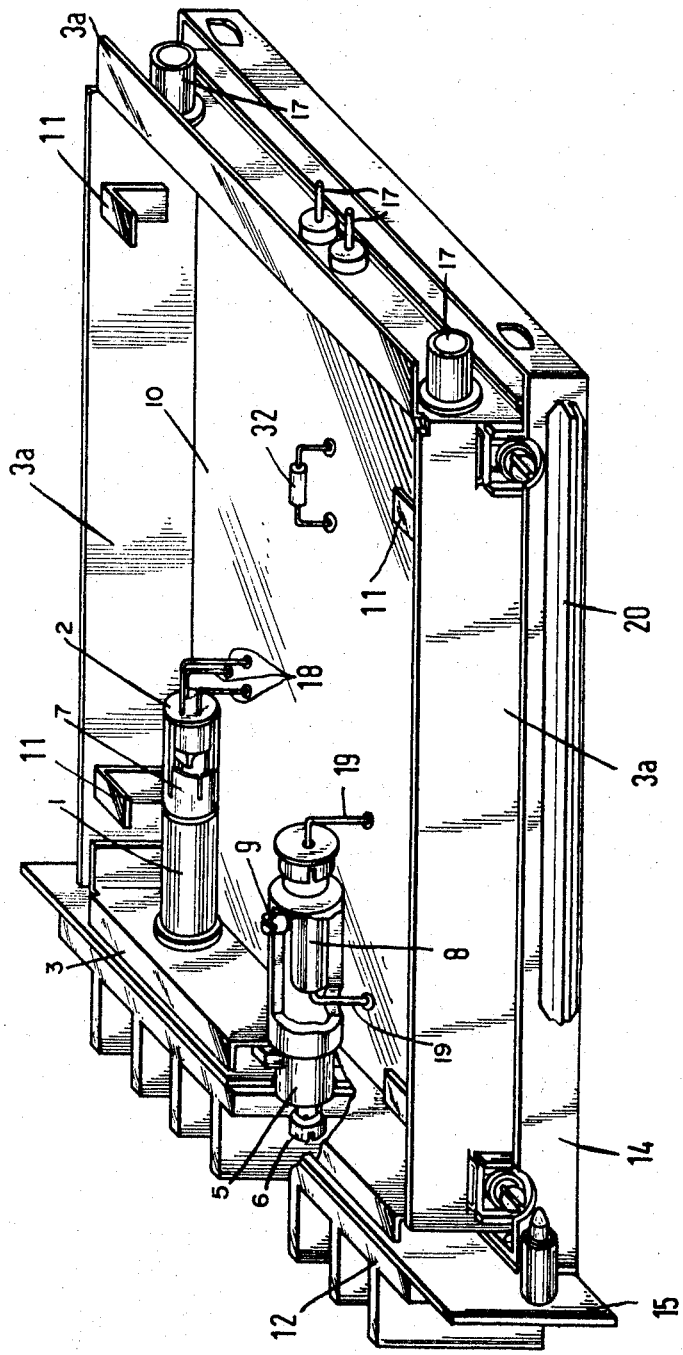

United States Patent Office 3,316,454
Patented Apr. 25, 1967

3,316,454
COOLING ARRANGEMENT FOR THERMALLY
LOADED ELEMENTS OF A STRUCTURAL
UNIT FOR ELECTRICAL APPARATUS
Hans Donath and Gerd Nothnagel, Munich, Germany, assignors to Siemens & Halske Aktiengesellschaft Berlin and Munich, a corporation of Germany
Filed Aug. 30, 1965, Ser. No. 483,880
Claims priority, application Germany, Aug. 28, 1964, S 92,852
8 Claims. (Cl. 317—100)

The invention relates to a structural unit for apparatus in communications technology, which is disposed in a casing for shielding it from electromagnetic fields, in particular a structural unit of flat construction, equipped with circuit plates in the manner of printed circuits, which contains thermally high-loaded structural elements such as transistors, resistors, and the like.

In such structural units, there frequently arises the probelm of keeping the heat liberated by thermally high-loaded structural elements such as transistors, resistors, diodes, hot conductors and the like from other structural parts on the printed circuit plate and so far as possible, to conduct it to the exterior. Such circuits are frequently disposed in shielded housings in which a cooling of the interior of the housing would be too expensive, or would lead to excessively great disadvantages as, for example, to an accumulation of dust within the casing.

The invention therefore has as its basic problem to conduct away the heat from such structural parts in a manner as simple as possible with avoidance of the above-described drawbacks.

This problem is solved, in a structural unit for apparatus of communications technology of the type mentioned, by an arrangement in which the thermally high-loaded constructional elements are connected with solid parts in turn consisting of good heat-conducting material, especially in bar form, with such parts being extended to the walls of the casing, to which they are connected with good heat conduction and tightly with respect to the electromagnetic fields from which the apparatus is to be shielded.

An especially advantageous solution with respect to the heat conduction consists in the provision, exteriorly of the walls of the casing, of additional heat-dissipating bodies, in particular ribbed cooling bodies, extending the heat-conducting parts through the casing wall, to such bodies. and connecting them in good thermal contact with the latter.

An advantageous construction of the heat-conducting parts utilizes a cylindrical body which, in the contact zone with the structural elements, is constructed in the form of a hollow cylinder with feathered portions into which there is inserted the structural element to be cooled. This embodiment is especially favorable for structural parts whose terminal connections are arranged in axial directions at one side only, as for example in small transistors.

In the case of larger structural elements, for example, transistors of very high power, a construction is advantageous in which the heat-conducting parts are fabricated as plate-like members on which the constructional elements to be cooled are mounted.

In many cases, it is advantageous to secure structural elements of cylindrical form, for example, resistors in a heat conducting hollow cylinder, utilizing heat-conducting contacting screws.

Figure 2:
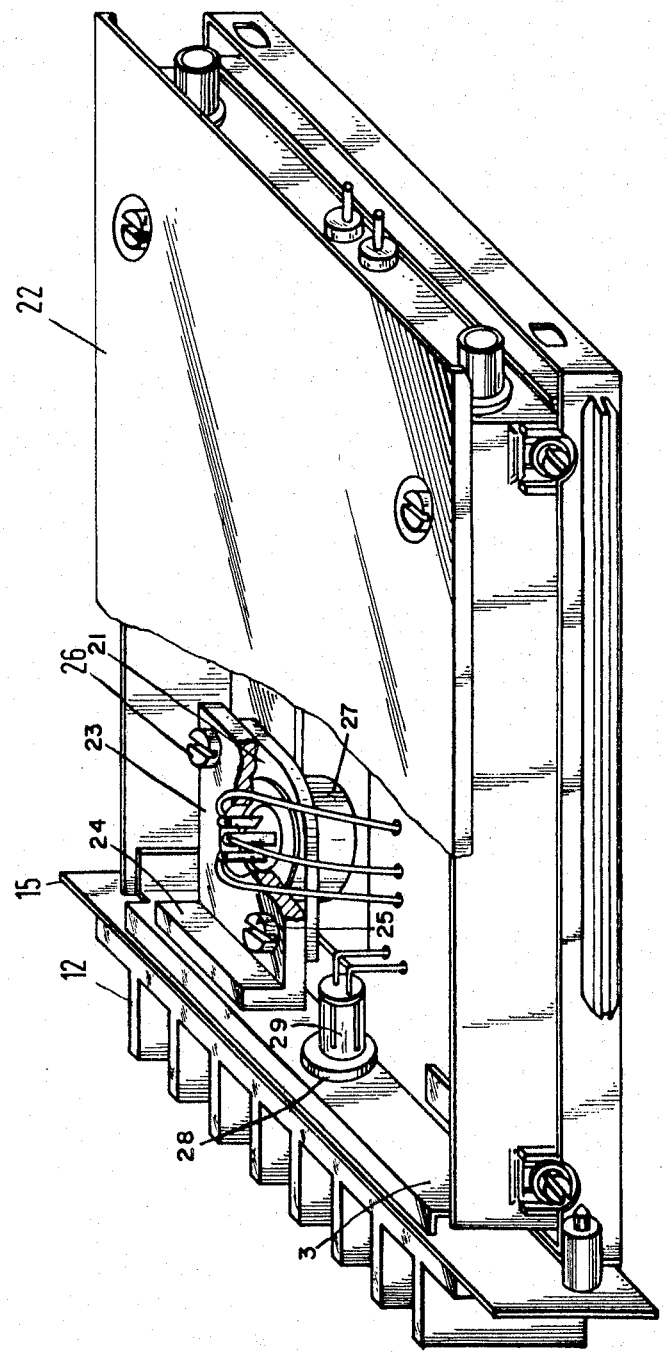

In the drawings, wherein like reference numerals indicate like or corresponding parts:

FIG. 1 is a perspective view of a flat constructional assembly utilizing a plug-in construction, illustrating the mounting of several of the parts that would normally be associated therewith; and FIG. 2 is a corresponding view of a similar assembly illustrating additional mounting arrangements of parts contained therein.

FIG. 1 illustrates a so-called flat constructional assembly utilizing a plug-in construction such as is frequently employed in relatively large apparatus as, for example, in directional-radio or carrier-frequency apparatus. Such constructional assembly may consist of a shield casing in which there are mounted one or more circuit plates. The shield casing, having side and end walls 3a and a front wall 3, is secured in a frame 14 which may be provided with side rails 20. The structural unit may be slid on such slide rails into the communications apparatus unit and connected over plug connections 17 with the circuiting of an apparatus unit. For sake of clarity, the shield cover of the structural unit represented is not illustrated in this example, which cover may be connected over angle pieces 11 with the casing. Inside the casing, there is disposed a circuit plate 10 carrying structural parts, the wiring of which is preferably formed in the manner of printed circuits. The lower side of the plate 10 carries the printed wiring proper, while the visible upper side carries structural elements such as resistors, capacitors, transistors and the like. For the sake of clarity, there is indicated in the example, only one of the thermally loaded constructional parts, namely, a resistor 32. The lead connections of such structural parts are in a known manner conducted through bores in the circuit plate 10 to the contacting side and are there connected with the wiring, for example, by a wash soldering operation.

The thermally high-loaded constructional elements of this circuit, such as the transistor 2 and the resistor 8, are, according to the invention, connected with the heat-conducting parts 1 and 5, respectively. Such heat-conducting parts consist of a good heat-conducting material, for example, copper, and are constructed as bars, which in the example of construction are extended through the front wall 3 of the shielding casing and the front plate 15 to a ribbed heat-dissipating body 12. Thereby, heat generated in the structural element is substantially conducted to the ribbed body 12. In the event, however, that the front plate has, in and of itself, a sufficiently large cooling surface, or is constructed with good heat-conducting properties, an additional heat-dissipated body is not necessary and the heat-conducting bars may be secured with good thermal engagement directly to such front plate. The heat-conducting parts 1, 5 are in this embodiment, maintained in good thermal conductive connection with the ribbed body by means of screws 6. This connection can also be made in another manner, as for example, by soldering. The length and the cross-section of the heat-conducting bars are effected in accordance with requirements as to the distance of the structural parts to be cooled from the cooling surface and the particular operating temperatures, so that the structural parts may advantageously be placed at any desired locations on the surface of the circuit plate 10.

The heat-conducting part 1 has a cylindrical form and is designed for the cooling of a transistor 2 of relatively small dimensions. The end portion of this heat-conducting part is constructed in the form of a slotted hollow cylinder 7 provided with a spring action so that following insertion of the transistor 2, a good thermal contact results between the structural element and the heat-conducting part. This construction thereby permits very rapid and easy assembly and is usable to advantage especially when the transistors or diodes utilized are predominantly of uniform external diameter. The transistor is electrically connected over connecting wires 18 with the printed circuit plate.

Another type of mounting of a structural element with a heat conducting part is employed in connection with resistor 8. The end piece of the heat conductor 5 for such resistor is likewise constructed as a hollow cylinder but in this case the thermal contacting of the structural element with the heat-conducting part takes place through the pressure of a screw 9. This construction is particularly advantageous when structural elements of differing diameter are to be accommodated in shells of the same size, as for example, resistors having different diameters for different load requirements. The connecting wires are in this example of construction led out on both sides in the direction of the longitudinal axis of the resistor 8, and the connection that is adjacent the front wall is conducted through a bore in the socket of the heat-conducting part 5 to the circuit plate 10. If it is desired to further improve the heat dissipation by means of a shell construction or socket arrangement and a clamping screw, it is desirable to fill the shell with a good heat-conducting agent. For example, there are available, in this connection, such materials as epoxy-resin mixtures, silicon-carbide or the like. For electrical insulation of the structural elements, as for example of transistor casings or resistors, especially unglazed wire resistors, from the heat-conducting parts, the use of insulating interlayers is recommended, for example, foils or the like. Materials having favorable properties with respect to insulating capacity and heat stability of the interlayers, are for example, materials known under the name of Triafol, layers of mica, or similar materials.

The heat-conducting parts 1 and 5, as shown in the drawing, are provided with screw threads and are secured by means of nuts to the front wall 3. The connection between the front wall 3 and the heat conducting parts 1 and 5, can also be effected by soldering or clamping. This connection has, in particular, the purpose of preventing a loss in the shielding effect of the casing at the lead-throughs. Moreover, by means of such connection between front wall and front place or ribbed heat-dissipating body, an additional cooling of the front wall can be achieved in the event this should be necessary or desirable. With the use of a heat dissipating body or of a correspondingly constructed front plate, the front wall of the casing can be produced with a light construction of very thin material, favorable from a manufacturing viewpoint, which is frequently desired. The shielding of the constructional assembly, in this case, thus does not have to be utilized for heat transfer. The connecting pieces of the heat-conducting parts between the front wall and the structural element to be cooled, together with the printed conductor plate, thus form a structural unit. The structural parts to be cooled are disposed to provide the shortest electrical connections to the desired points on the printed circuit plate and can be soldered in common with the other structural parts, as for example by means of a dip or wash soldering operation.

FIG. 2 likewise illustrates a flat constructional assembly utilizing a plug-in construction similar to that of FIG. 1. Accordingly, the individual parts, which remain the same as those of FIG. 1, are not designated in detail in this figure. The assembly is normally closed by a cover 22 which likewise seals the contents with respect to electromagnetic fields, which cover is only partially illustrated in the figure in order to expose structural parts disposed in the interior of the shield casing. In the feathered end piece 29 of a heat-dissipating body 28 of the type previously described, there is located, in this example, a diode which is subjected to a relatively great load. Moreover, there is to be seen a larger transistor 27 of usual type, which is connected by means of a flange 21 and screws 25 and 26, with an angle-shaped heat-conducting part 23, which is disposed with the flange 24 abutting the front wall 3 so that a tight connection against high-frequency electromagnetic fields is provided. Secured on the flange 24 are one or more threaded cylinders which are omitted in the figure for the sake of clarity. These threaded cylinders, however, may be constructed in the same manner as the heat-conducting parts 1 and 5 in FIG. 1. The thermal contacting of such cylinders is again effected by screws or the like with the front plate 15 and the heat-dissipating body 12, respectively. This construction of the heat-conducting parts is particularly suitable for transistors of relatively high power of the types now commonly employed, or for similar diodes, as for examples, silicon rectifiers for relatively heavy loads.

Through the low heat resistance between the structural parts and the heat-dissipating body in the systems according to the invention, it is possible with corresponding dimensioning of the front plate or of the heat-dissipating body connected therewith for the heat-conducting structural parts to be more highly stressed than would otherwise be possible.

As a heat-dissipating wall, or a wall to which the heat-dissipating body is attached, there may be utilized with corresponding relationships as to the most favorable cooling of the structural assemblies, any other casing walls, covers, or plurality of wall parts in a like manner.

Changes may be made within the scope and spirit of the appended claims which define what is believed to be new and desired to have protected by Letters Patent.

We claim:

1. A cooling arrangement for elements of a structural unit for apparatus in electrical communication technology, which unit is provided with lateral side rails and rear plug contacts, and is constructed as a shallow plug-in assembly of flat construction having a front means which can be received in a supporting structure adjacent to those of other similar structural units, said structural unit comprising a frame and a shield casing tightly sealed with respect to high frequency radiation by means including a cover at opposite sides to form a casing, a printed circuit plate surrounded by said shield casing in a shielded manner, said printed circuit plate carrying, in addition to other structural parts, thermally highly loaded structural elements such as transistors, resistances and the like which are disposed thereon in electrically favorable relation to cooperable components thereof, relatively massive metal pieces having good heat conduction characteristics to which the thermally highly loaded structural elements are connected in good heat conducting relation, said massive metal pieces, in turn extending from the respective favorable circuit locations of the associated structural elements through the front wall of the shield casing to the front means and connected therewith in good heat conducting relation.

2. A cooling arrangement according to claim 1, wherein said front means comprises a front plate of the unit.

3. A cooling arrangement according to claim 1, wherein said front means includes an additional heat radiating member disposed in front of the front plate of the unit, the metal pieces extending through the front plate in tightly sealed relation therewith with respect to high frequency radiation.

4. A cooling arrangement according to claim 1, wherein, for structural elements with a cylindrical shape, the associated massive metal piece is constructed in the form of a round bar, the inner end of which is provided with a chamber forming a hollow cylinder in which the associated structural element is disposed, the latter being connected to the circuit plate only through the connection leads therefor, and with said structural element being in good heat transfer relation with such massive piece.

5. A cooling arrangement according to claim 3, in which the end of the round bar constructed as a hollow cylinder is provided with longitudinally extending slits to form a resilient structure for the reception of relatively small structural elements.

6. A cooling arrangement according to claim 3, in which thermally highly loaded structural elements of cylindrical shape are surrounded by an insulating casing, comprising in further combination clamping screws carried by the hollow cylinder and operative to press radially upon the structural element involved.

7. A cooling arrangement according to claim 3, comprising a sealing compound filling the air spaces between the structural element and the cooperable hollow cylinder and providing good heat conductivity between such element cylinder.

8. A cooling arrangement according to claim 1, in which the heat conducting pieces for relatively large structural elements are each constructed in the form of an angle-shaped member, the shorter side of which abuts the front wall of the shield casing and is provided with cylindrically-shaped extensions which extend through the front wall of the same to said front means, with which they are connected in good heat conducting relation, the structural element involved being connected in good heat conductive relation with the longer side of such angle-shaped member.

References Cited by the Examiner

UNITED STATES PATENTS

| | | | |
|---|---|---|---|
| 2,893,704 | 7/1959 | Passman | 317—100 X |
| 3,059,184 | 10/1962 | Germain | 317—100 X |
| 3,211,822 | 10/1965 | Krall et al. | 317—100 X |
| 3,226,602 | 12/1965 | Elfving. | |
| 3,240,263 | 3/1966 | Stewart | 317—100 X |

ROBERT K. SCHAEFER, *Primary Examiner.*

M. GINSBURG, *Assistant Examiner.*